(12) United States Patent
Crossfield

(10) Patent No.: US 6,486,655 B1  
(45) Date of Patent: Nov. 26, 2002

(54) MAGNETIC POSITION SENSING TECHNIQUES

(75) Inventor: Michael D. Crossfield, West Wickham (GB)

(73) Assignee: Flying Null Limited, Harston (GB)

(*) Notice: Subject to any disclaimer, the term of this patent is extended or adjusted under 35 U.S.C. 154(b) by 0 days.

(21) Appl. No.: 09/647,568

(22) PCT Filed: Mar. 31, 1999

(86) PCT No.: PCT/GB99/01003
§ 371 (c)(1),
(2), (4) Date: Dec. 7, 2000

(87) PCT Pub. No.: WO99/50690
PCT Pub. Date: Oct. 7, 1999

(30) Foreign Application Priority Data

Mar. 31, 1998 (GB) .............................. 9806923

(51) Int. Cl.⁷ ........................ G01B 7/14; G01B 7/30; G01V 3/08; G01V 15/00; A61B 5/05
(52) U.S. Cl. ..................... 324/207.17; 324/207.22; 324/207.24; 324/207.25; 340/870.33
(58) Field of Search ............. 324/67, 326, 207.13, 324/207.15–207.19, 207.22–207.25; 92/5; 235/449; 600/434; 340/551, 572.1, 572.2, 870.32, 870.33

(56) References Cited

U.S. PATENT DOCUMENTS

| | | | |
|---|---|---|---|
| 4,654,590 A | * 3/1987 | Kitaura et al. | 324/207.13 |
| 4,678,993 A | * 7/1987 | Vinnemann et al. | 324/207.13 |
| 4,709,210 A | 11/1987 | Pond | 324/207.23 |
| 5,425,367 A | 6/1995 | Shapiro et al. | 324/326 X |
| 5,488,566 A | 1/1996 | Woolsey | 324/207.11 X |
| 5,585,725 A | 12/1996 | Powell et al. | 324/326 |

FOREIGN PATENT DOCUMENTS

| | | |
|---|---|---|
| EP | 9411815 | 11/1994 |
| EP | 9630471 | 6/1996 |
| WO | 9600367 | 2/1996 |
| WO | 9600823 | 4/1996 |
| WO | 9701662 | 6/1997 |
| WO | 9802479 | 8/1998 |

* cited by examiner

Primary Examiner—Gerard R. Strecker  
(74) Attorney, Agent, or Firm—Oppenheimer Wolff & Donnelly LLP

(57) ABSTRACT

A method of sensing the position of a first element with respect to a second element is disclosed, the first element being movable with respect to the second. The method comprises: (a) fixing a first magnetic marker to said first element; (b) fixing a second magnetic marker to said second element; (c) sensing the positions of the two markers by a remote magnetic sensing technique. Optionally, a third magnetic marker may be used, the second and third markers then preferably being located at the extremes of travel of said first element. The method may be used to determine linear or angular relationships.

9 Claims, 2 Drawing Sheets

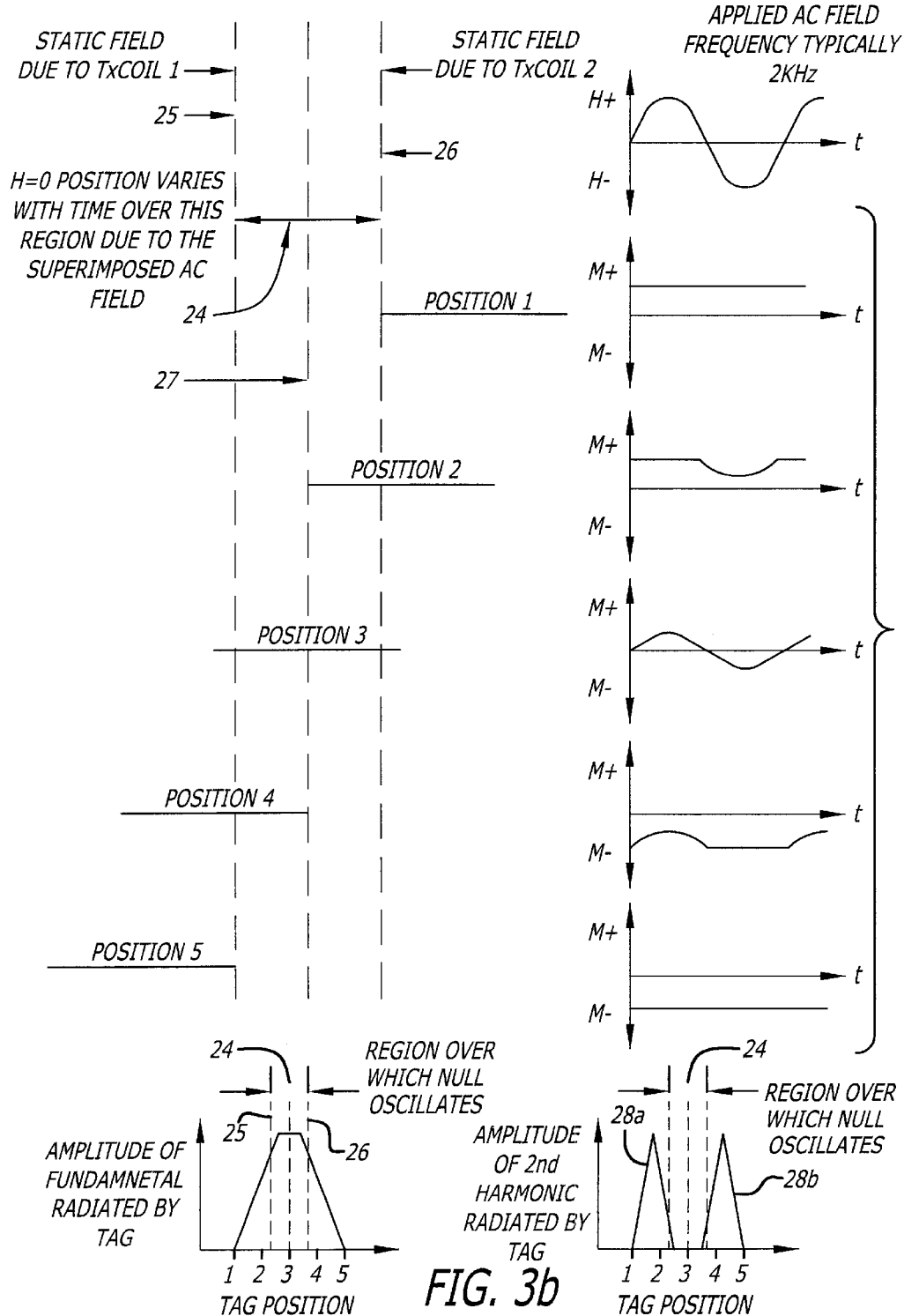

MAGNETIC POSITION SENSING TECHNIQUES

This invention relates to position sensing and, more particularly but not exclusively, to a position sensor based on magnetic principles and employing elements of soft magnetic material. Such material is conveniently a high permeability material with an axis of easy magnetisation. Suitable materials for this purpose include the materials conventionally used in electronic article surveillance (EAS) techniques; these materials are well known in the art and do not require further description herein.

In previous patents, in particular U.S. Pat. Nos. 6,144, 300, 6,373,388, 6,323,770, 6,323,769, 6,329,916, and 6,371, 379, we have described and claimed novel techniques for spatial magnetic interrogation and novel tags. The technology described in U.S. Pat. Nos. 6,144,300, 6,373,388, 6,323, 770, 6,323,769, 6,329,916, and 6,371,379 is based on exploiting the behavior of magnetic materials as they pass through a region of space containing a magnetic null. In particular, these earlier applications describe, inter alia, how passive tags containing one or more magnetic elements can perform as remotely-readable data carriers, the number and spatial arrangement of the elements representing information.

In the above applications we described a number of possible system embodiments employing either permanent magnets or electromagnets to create the magnetic null. We also described several system implementations some of which are particularly appropriate for tags employing very low coercivity, high permeability magnetic elements. These implementations work by detecting harmonics of a superimposed low-amplitude alternating interrogation field.

In a later patent, U.S. Pat. Nos. 6,230,379, we describe arrangements which work by detecting the baseband signals generated by the passage of the tag through the magnetic null, without the need for any superimposed alternating interrogation field. Specific designs for readers are described in PCT/GB97/02772. The content of these above-mentioned patent applications (hereinafter termed "the prior FN applications") is incorporated herein by reference thereto.

The present invention preferably utilises techniques and materials such as described in the prior FN applications, or components of such techniques and materials, in order to provide a position sensor and method.

Preferably, two or more elements of soft magnetic material are utilised in the invention and the relative positions of the magnetic elements are changed by the movement which is to be sensed. The positions of the magnetic elements are sensed in a remote way by a suitable means. One suitable means is the spatial magnetic interrogation technique described in WO 96/31790.

One embodiment of the technique disclosed in WO 96/31790 may be defined as a method of determining the position of a magnetic element, or the relative positions of two or more magnetic elements on a tag, the magnetic element(s) having non-linear magnetic properties and a preferential axis of magnetisation, which is characterised by the steps of: (1) applying a magnetic field to an interrogation zone where the magnetic element(s) is or are located, or is or are expected to be located, said magnetic field being: (i) generated by magnetic field generating means positioned independently of said magnetic element(s); (ii) such that a magnetic null as defined in WO 96/31790 is generated within said interrogation zone, the magnetic null being contiguous with regions where the applied magnetic field is sufficient to saturate the, or a part of the, magnetic element (s); and (iii) such that the direction in which the resolved component of the magnetic field is zero is or can be aligned with the preferential axis of magnetization of the or each magnetic element; (2) causing relative movement between said magnetic field and said magnetic element in the direction of the preferential axis of magnetisation of the magnetic element(s) such that at least a portion of the magnetic element, or of each of the magnetic elements in turn, becomes magnetically saturated and then enters the magnetic null; (3) detecting the magnetic response of the or each magnetic element during said relative movement; and (4) determining the position of the magnetic element, or the relative positions of the magnetic elements, from the time(s) of occurrence of the or each magnetic response.

The present invention is particularly appropriate for medical applications, where the status of movable elements or describes implanted inside the human body need to be ascertained externally.

PRIOR ART

Position sensors based an many different technologies have been developed. In general they utilise the movement of one element with respect to a reference in order to create a readily-measured effect. For example, one type of optical position sensor employs a glass strip carrying a pattern of opaque lines. An optical source on one side of the strip is detected by a photodiode on the other side whenever there is no opaque region between them. Linear motion of the strip relative to the optical sensor pair results in electrical pulses being generated by the photodiode, and position relative to a datum may be determined by counting the number of pulses generated. This arrangement, in common with most sensors providing electrical output, requires detectable features (in this case the optical pattern) to be close to the sensing means (in this case the light beam). This generally makes such sensors inconvenient for implanting inside the human body because of their bulk, and/or because of the need for connecting wires.

THE INVENTION

According to a one aspect of the present invention, there is provided a method of sensing the position of a first element with respect to a second element, the first element being movable with respect to the second, which comprises:
(a) fixing a first magnetic marker to said first element;
(b) fixing a second magnetic marker to said second element;
(c) sensing the positions of the two markers by a remote magnetic sensing technique.

The invention is based on detecting small elements of soft magnetic material. In the simplest arrangement, one element is attached to a moving or movable member, and another to a reference member. Using a remote magnetic sensing technique, the positions of the two magnetic elements can be detected. The preferred magnetic sensing principle is that described in WO 96/31790. This employs a null in a magnetic field to locate the position of a piece of soft magnetic material. By scanning the null across the plane containing the two magnetic elements, their presence can be detected, and by relating the time of occurrence of the detections to the scanning pattern and speed, their separation can be deduced.

Thus, in one embodiment of the invention, the method includes the steps of: (1) applying a magnetic field to said magnetic markers, said magnetic field being: (i) generated by magnetic field generating means positioned independently of said magnetic markers; (ii) such that a magnetic null as defined in WO 96/31790 is generated, the magnetic null being contiguous with regions where the applied magnetic field is sufficient to saturate the, or a part of the, magnetic markers; and (iii) such that the direction in which the resolved component of the magnetic field is zero is or can be aligned with the preferential axis of magnetisation of the or each magnetic marker; (2) causing relative movement between said magnetic field and said magnetic markers in the direction of the preferential axis of magnetisation of the magnetic markers such that at least a portion of each of the magnetic markers in turn becomes magnetically saturated and then enters the magnetic null; (3) detecting the magnetic response of each magnetic marker during said relative movement; and (4) determining the relative positions of the magnetic markers from the times of occurrence of the or each magnetic response.

A variant on this arrangement uses fixed magnetic elements at the extremes of travel of the moving element, i.e. 3 elements in total. An advantage of this scheme is that the separation of the two fixed elements is known, so that the position of the moving element as a fraction of the fixed element spacing can be determined directly from the ratio of the spacings between the 3 detection signals, without the need for knowledge of the null scanning speed. This eliminates the need for accurate calibration of the reader equipment, and means that, for some applications, a very simple manually scanned sensor is practical.

The same principle can be employed in a rotary position sensor, this time using a rotating magnetic null—for example, such as described in our patent application PCT/GB97/03389 (WO 98/26312, published Jun. 18, 1998). In this case the fixed element is placed at a reference angle. The position of the moving or movable element is determined by detecting the point between successive detections of the reference element at which the moving element is detected. Since there is the potential for a 180° ambiguity in this system, for some applications it is necessary to ensure that the fixed marker responds differently to interrogation with the gradient field in different directions along its axis. This may be done by applying a local magnetic bias to the second magnetic marker, e.g. from a further magnetised element; one technique for this is described in GB9717475.9 and PCT/GB98/02479. Alternatively, the bias may be achieved by suitably shaping the element, as described in application GB9800064.9 (Sentec Limited, assigned to Flying Null Limited) and PCT/GB99/00017.

Advantageously, the remote magnetic sensing technique is that described in WO 96/31790. The magnetic markers are preferably soft magnetic materials of high permeability and having an axis of easy magnetisation. The soft magnetic axis will generally be aligned with the direction of motion when that motion is linear. It will also generally be aligned with the direction of scanning the magnetic null when the techniques of WO 96/31790 are used.

For a better understanding of the invention, reference will now be made, by way of example, to the accompanying drawings, in which:

FIG. 3 illustrates the preferred magnetic sensing technique for use in the present invention. FIG. 3*b* illustrates the magnetic interaction between a magnetic element and an applied magnetic field according to an embodiment of the present invention.

Figure 1:
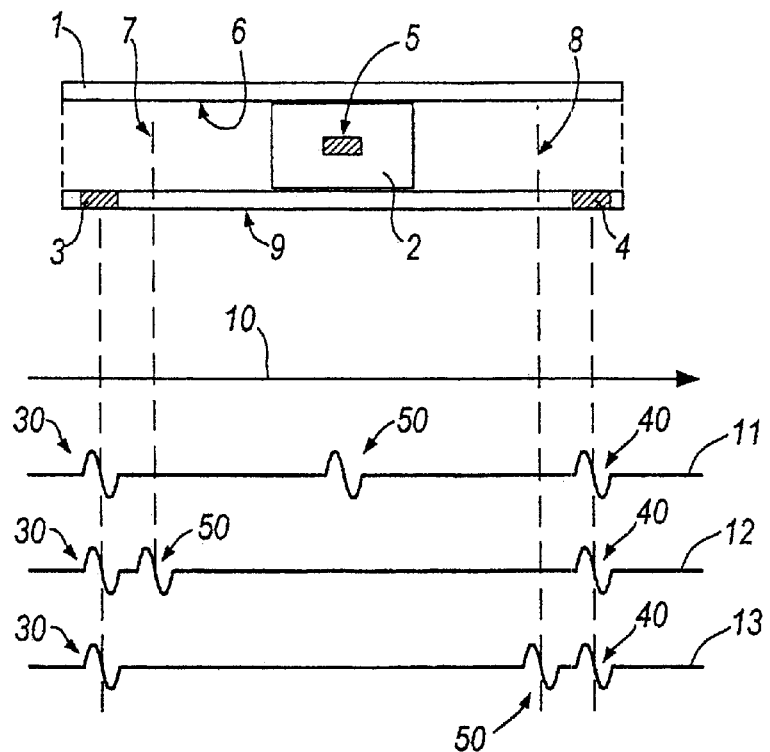
FIG. 1 illustrates a three-marker position sensor for sensing linear motion.

Referring to FIG. 1, a tube 1 of uniform internal and external cross sections Contains a piston 2 which makes a tight fit with the inner tubular wall 6. Piston 2 carries a centrally located soft magnetic marker 5. Soft magnetic markers 3 and 4 are applied to the outer wall 9 of tube 1 and serve as reference markers. The piston 2 is constrained to move so that its mid-point (i.e. marker 5) is able to move between limits indicated as 7 and 8, respectively. Arrow 10 indicates the direction of magnetic null scanning according to the techniques taught in the prior FN patent applications described hereinabove.

Traces 11, 12 and 13 indicate the output of the sensor when the piston is in three different positions—firstly (trace 11), when centrally located (as depicted); next (trace 12) when the piston is at its extreme left hand position; and thirdly (trace 13) when the piston is at its extreme right hand position. In each of these traces, feature 30 is the magnetic response of marker 3; feature 40 is the magnetic response of marker 4, and feature 50 is the magnetic response of marker 5. Since the precise location of markers 3 and 4 is known, the relative position of signal feature 50 with respect to features 30 and 40 indicates the current position of marker 5 and hence of piston 2. Because two reference signals are present, there is no need to know the scanning speed in order to determine the position of piston 2; the ratio of the spacings of signal features 30, 40 and 50 is all that is required.

Figure 2:
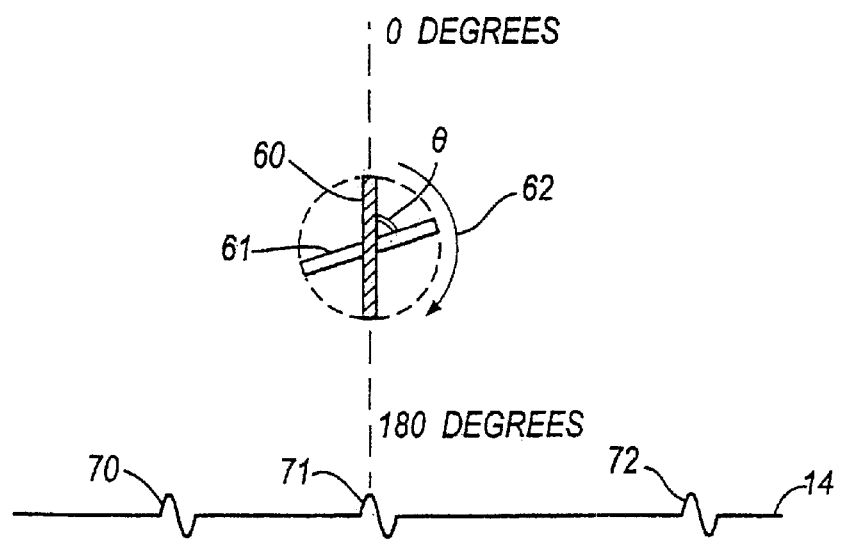
FIG. 2 illustrates a rotary position sensor of this invention.

Referring now to FIG. 2, a fixed marker 60 carries a soft magnetic material whose easy magnetic axis is aligned along its length. A second marker 61, also carrying a soft magnetic material whose easy magnetic axis is aligned along the length of the marker, is fixed to the part whose rotary position is to be determined. A rotating magnetic field is applied to the system, and interacts sequentially with the soft magnetic materials on markers 61 and 62. The applied field is rotated at a known, uniform rate. Arrow 62 indicates the direction of rotation of the magnetic null plane in the applied magnetic field, and also indicates how marker 61 may be positioned with respect to marker 60. Because the rotating magnetic field interacts at moments in the time domain which are directly related to the angular separation between the respective magnetic elements on markers 60 and 61, the times at which responses are detected (by means known in the art) enables the angular separation θ to be determined. Trace 14 indicates the output of the sensor with time, during the rotation of marker 61. Feature 70 corresponds to the position of marker 61 at zero degrees, feature 71 corresponds to the position of marker 61 at θ degrees (i.e. as indicated); and feature 72 corresponds to the position of marker 61 at 180 degrees.

FIG. 3 illustrates the preferred magnetic sensing technique for use in the present invention. These transmitter coils are mutually parallel and spaced apart from one another; the magnetic element under investigation passes through the two coils with linear motion and orthogonally with respect to the planes containing the coils. the magnetic element is a magnetically soft material and is an anisotropic material having a preferential (i.e., easy) axis of magnetisation; this axis runs along the length of the element and thus coincides with the direction of movement of the element.

The coils are connected together such that their winding directions are opposed in sense, and a DC current is passed through them. This causes opposing magnetic fields to be set up on the coils axis, such that a position of zero field—a magnetic null—is created along the coil axis, mid-way between the coils. The level of current in the coils is such as to heavily saturate a small sample of high permeability magnetic material placed at the center of either of the two coils. A much lower amplitude AC current is also caused to flow in opposite directions through the two coils, so that the AC fields produced sum together midway between the coils. This can be easily arranged by connecting a suitable current source to the junction of the two coils, with a ground return. The frequency of this AC current may typically be about 2 kHz, but its value is not critical, and suitable frequencies extend over a wide range. This AC current generates the interrogating field which interacts with a magnetic tag to generate a detectable response. Another effect of this AC current is to cause the position of zero field—the magnetic null—to oscillate about the mid-way position along the coils axis by a small amount (this is a wobble or oscillation rather than an excursion of any significant extent). The resultant field has a magnetic null plane whose mean position is defined by the opposing DC fields, and whose absolute position varies as a result of the small AC field component. The null plane thus oscillates to and from at a frequency determined by that of the AC field component, and by an amount determined by the relative field strength between the DC components on the one hand and the AC component(s) on the other hand. The field on either side of the null plane is large and is sufficient to magnetically saturate the soft magnetic material of which the element is formed.

For ease of illustration, the oscillation of the plane containing the magnetic null is represented in FIG. 3 by the bold double-headed arrow (↔) 24, the extreme positions of the plane being represented by dashed lines 25 and 26, respectively, and the mid-point between limiting planes 25 and 26 being represented by dashed line 27. In the right hand portion of FIG. 3, the applied AC field is shown varying with time between positive (H+) and negative (H−) field values. Beneath the graph of the applied AC field, there are five graphs depicting how the net magnetisation of the magnetic element varies with time in each of five geometric positions indicated to the left as Position 1, Position 2, etc. Planes 25 and 26 define the limits of regions within which magnetic field polarity reversals occur. In practice, the separation between planes 25 and 26 is typically of the order of 1 mm; for a given magnetic material, this distance can be increased or decreased at will within certain limits by varying the amplitude of the AC current and/or the DC current in the coils.

At all times, the magnetic element has a linear magnetic axis which is orthogonal to the planes 25, 26 and 27.

In Position 1, the end of the magnetic element is adjacent to plane 26; in this condition, it experiences a positive magnetic field at all times and its net magnetisation is time-invariant. In Position 2, the leading end of the element has reached the mid-way plane 27. Most of the magnetic material, however, still remains outside limiting plane 26. In consequence, the null plane is able to interact with only a portion of the magnetic material, resulting in a time-variable net magnetisation having the repeat pattern shown, i.e. a straight line positive-value portion followed by a generally sinusoidal arc which dips towards zero and then rises to its original positive value.

In Position 3, the magnetic material is positioned symmetrically with respect to the mid-way plane 27. Here, the net magnetization versus time plot consists of a sine wave whose frequency corresponds to that of the applied AC field. In Position 4, the majority of the magnetic element experiences a negative field at all times, while a smaller part of the element experiences polarity reversals; this leads to the net magnetisation versus time plot as shown. The fact that Position 4 is in effect the inverse of Position 2 is reflected in the relationship between the magnetisation plots for these two positions; as can be seen, the plot for Position 4 is effectively a mirror image of that for Position 2 but with the curved portions time-shifted.

Finally, at Position 5, all of the tag experiences the negative field, and no part of the tag experiences field polarity reversal. In consequence, the net magnetisation is time-invariant, being a constant negative value as shown.

When a marker containing such a magnetic element is passed along the coils' axis through the region of zero field, it will initially be completely saturated by the DC magnetic field. It will next briefly be driven over its B-H loop as it passes through the zero field region. Finally it will become saturated again. The portion of the traverse over which the magnetic material is "active", i.e. is undergoing magnetic changes, is physically small, and is determined by the amplitude of the DC field, the amplitude of the AC field, and the characteristics of the magnetic material. This region can easily be less than 1 mm in extent. If the level of the alternating field is well below that required to saturate the magnetic material in the tag, then harmonics of the AC signal will be generated by the tag as it enters the zero field region (Positions 1 to 2) and responds to the changing field. As the tag straddles the narrow zero field region (Position 3) the tag will be driven on the linear part of its B-H loop, and will interact by re-radiating only the fundamental interrogation frequency. Then, as the tag leaves the zero field region, (Positions 4 to 5) it will again emit harmonics of the interrogation field frequency.

A receiver (Rx) coil arranged to be sensitive to fields produced at the zero field region, but which does not couple directly to the interrogator (Tx) coils, will receive only these signals. Such an arrangement can be achieved by using separate Tx and Rx coils physically arranged to have low mutual coupling; or by using a single coil (having both Tx and Rx functions) together with suitable filtering in the Tx and Rx paths. The variation of these signals with time as the tag passes along the coils' axis gives a clear indication of the passage of the ends of the magnetic material through the zero field region.

The result of this interaction between the tag and the magnetic field it experiences is shown in FIG. 3b. Here, the region 24 over which the magnetic null oscillates is shown on a smaller scale, and the numbered dots represent the location of the mid-point of the tag in each of Positions 1–5. The generation of a harmonic signal by the tag (illustrated by the second harmonic of the applied frequency) is apparent at positions where the tag enters the region defined by limiting planes 25 and 26, i.e. the zone where magnetic field polarity reversals occur. Because of the symmetry of the system, a single magnetic element will generate a doublet peak 28a and 28b since Positions 2 and 4 are redundant.

What is claimed is:

1. A method of sensing the position of a first element with respect to a second element, the first element being movable with respect to the second, which comprises:

(a) fixing a first magnetic marker comprising a low coercivity, high permeability material to said first element;

(b) fixing a second magnetic marker comprising a low coercivity, high permeability material to said second element;

(c) fixing a third magnetic marker comprising a low coercivity, high permeability material to a position on said second element remote from said second magnetic marker, such that the locus of motion of said first element is between said second and third magnetic markers; and (d) sensing the positions of the two elements by a remote magnetic sensing technique.

2. A method as claimed in claim 1, wherein the position of said first element is determined from the timing of the magnetic responses of said first and second magnetic markers.

3. A method as claimed in claim 2, characterized in that the magnetic sensing technique is characterized by the steps of: (1) applying a magnetic field to said magnetic markers, said magnetic field being: (i) generated by magnetic field generating means positioned independently of said magnetic markers; (ii) comprised of a first region at which the component of the magnetic field resolved in a first direction is zero, and where in regions contiguous with said first region the component of the magnetic field resolved in said first direction is sufficient to saturate the, or part of the, magnetic markers; and (iii) such that the direction in which the resolved component of the magnetic field is zero is or can be aligned with the preferential axis of magnetization of the or each magnetic marker; (2) causing relative movement between said magnetic field and said magnetic markers in the direction of the preferential axis of magnetization of the magnetic markers such that at least a portion of each of the magnetic markers in turn becomes magnetically saturated and then enters the magnetic null; (3) detecting the magnetic response of each magnetic marker during said relative movement; and (4) determining the relative positions of the magnetic markers from the times of occurrence of the or each magnetic response.

4. A method as claimed in claim 1, 2 or 3, characterized in that said second element is a tube through which said first element is arranged to travel, said second and third magnetic markers being fixed at spaced locations along the tube.

5. A method as claimed in claim 4, characterized in that said second and third magnetic markers are located at the extremes of travel of said first element.

6. A method as claimed in claim 1, 2 or 3, characterized in that said second and third markers are constituted by a single marker and in that a rotating magnetic field is applied to the elements to enable the angular relationship between said first and second elements to be determined.

7. A method as claimed in claim 6, characterized in that said first and second magnetic markers are arranged to have distinguishable responses when subjected to the same magnetic field conditions.

8. A method as claimed in claim 7, characterized in that a local magnetic bias element is applied to the second marker.

9. A method as claimed in claim 8, characterized in that said local magnetic bias is produced by an additional magnetized magnetic element.

* * * * *